(12) United States Patent
Masuko et al.

(10) Patent No.: US 9,443,030 B2
(45) Date of Patent: Sep. 13, 2016

(54) APPARATUS AND METHOD FOR DYNAMICALLY DISPLAYING AN OBJECT ON A BLANK AREA OF A WEB PAGE

(75) Inventors: Soh Masuko, Tokyo (JP); Hiromi Hirano, Tokyo (JP)

(73) Assignee: Rakuten, Inc., Tokyo (JP)

( * ) Notice: Subject to any disclaimer, the term of this patent is extended or adjusted under 35 U.S.C. 154(b) by 92 days.

(21) Appl. No.: 13/482,371

(22) Filed: May 29, 2012

(65) Prior Publication Data
US 2012/0284610 A1 Nov. 8, 2012

Related U.S. Application Data

(63) Continuation of application No. PCT/JP2010/071360, filed on Nov. 30, 2010.

(30) Foreign Application Priority Data

Nov. 30, 2009 (JP) ................................ P2009-272345
Nov. 30, 2009 (JP) ................................ P2009-272346

(51) Int. Cl.
*G06F 17/00* (2006.01)
*G06F 17/30* (2006.01)

(52) U.S. Cl.
CPC ..... *G06F 17/30893* (2013.01); *G06F 17/3089* (2013.01)

(58) Field of Classification Search
CPC .................. G06F 17/3089; G06F 17/2247
USPC ....................................................... 715/234
See application file for complete search history.

(56) References Cited

U.S. PATENT DOCUMENTS

| 6,023,714 | A * | 2/2000 | Hill et al. ..................... 715/235 |
| 6,907,566 | B1 * | 6/2005 | McElfresh et al. ........... 715/210 |
| 2002/0103704 | A1 | 8/2002 | Amano et al. |
| 2002/0133565 | A1 * | 9/2002 | Huat ............................. 709/218 |
| 2003/0149937 | A1 * | 8/2003 | McElfresh et al. ........... 715/517 |
| 2003/0149938 | A1 * | 8/2003 | McElfresh et al. ........... 715/517 |
| 2006/0103667 | A1 * | 5/2006 | Amit et al. ................... 345/619 |
| 2008/0097834 | A1 * | 4/2008 | McElfresh et al. ............ 705/10 |

(Continued)

FOREIGN PATENT DOCUMENTS

| JP | 2002-082874 A | 3/2002 |
| JP | 2002-109359 A | 4/2002 |

(Continued)

OTHER PUBLICATIONS

International Preliminary Report on Patentability dated Jul. 19, 2012 for counterpart application PCT/JP2010/071360.
"iLab Neuromorphic Vision C+ Toolkit (iNVT)", Copyright 2002-2004 by the University of Southern California (USC), iLab and Prof. Laurent Itti, pp. 1-3. Last updated Wednesday, Nov. 17, 2010, 11:43:02 PST.

(Continued)

*Primary Examiner* — Andrew McIntosh
(74) *Attorney, Agent, or Firm* — Sughrue Mion, PLLC (57) ABSTRACT

A server system receives a request for a Web page from a user terminal, extracts page data corresponding to the request from a Web DB, and transmits the page data to the user terminal. Further, the server system receives a request related to an object to be placed in a blank area of a Web page from the user terminal, extracts data corresponding to the request from an object DB, and transmits the extracted data or an object generated based on the data to the user terminal. The page data contains an embedded object display program for specifying a blank area of a Web page and placing an object in the blank.

8 Claims, 9 Drawing Sheets

(56) References Cited

U.S. PATENT DOCUMENTS

2008/0183593 A1* 7/2008 Dierks .................. 705/26
2009/0012863 A1* 1/2009 Saephan ................ 705/14

FOREIGN PATENT DOCUMENTS

| JP | 2002-183092 A | 6/2002 |
|----|---------------|--------|
| JP | 2003-274152 A | 9/2003 |
| JP | 2009-271887 A | 11/2009 |

OTHER PUBLICATIONS

"iLab Neuromorphic Vision C+ Toolkit Screenshots", Copyright 2002-2004 by the University of Southern California (USC), iLab and Prof. Laurent Itti, pp. 1-4. Last updated Wednesday, Nov. 17, 2010, 11:43:02 PST.

* cited by examiner

APPARATUS AND METHOD FOR DYNAMICALLY DISPLAYING AN OBJECT ON A BLANK AREA OF A WEB PAGE

CROSS REFERENCE TO RELATED APPLICATION

This application is a continuation-in-part application of International Application No. PCT/JP2010/071360 filed Nov. 30, 2010, claiming priority based on Japanese Patent Application Nos. 2009-272345 and 2009-272346 filed Nov. 30, 2009, the contents of all of which are incorporated herein by reference in their entirety.

TECHNICAL FIELD

The present invention relates to a framework for providing information to a user terminal through a Web page.

BACKGROUND ART

A framework for displaying a banner advertisement in a Web page is known (for example, see FIG. 5 in PTL 1). For example, by adding a URL of a banner advertisement (image file) into HTML data for defining a Web page, the banner advertisement (image file) corresponding to the URL can be displayed in the Web page (paragraphs [0044] to [0045] of PTL 1).

A program having the function of generating a saliency map from an input still image and outputting the saliency map in a predetermined file format is disclosed in, for example, NPL 1. Further, various application aspects related to the program are specifically described in, for example, NPL 2. Note that, in general, the saliency is the degree of attracting visual attention. Further, the saliency map is visualization of the degree of attracting visual attention calculated using a predetermined algorithm.

Figure 9:
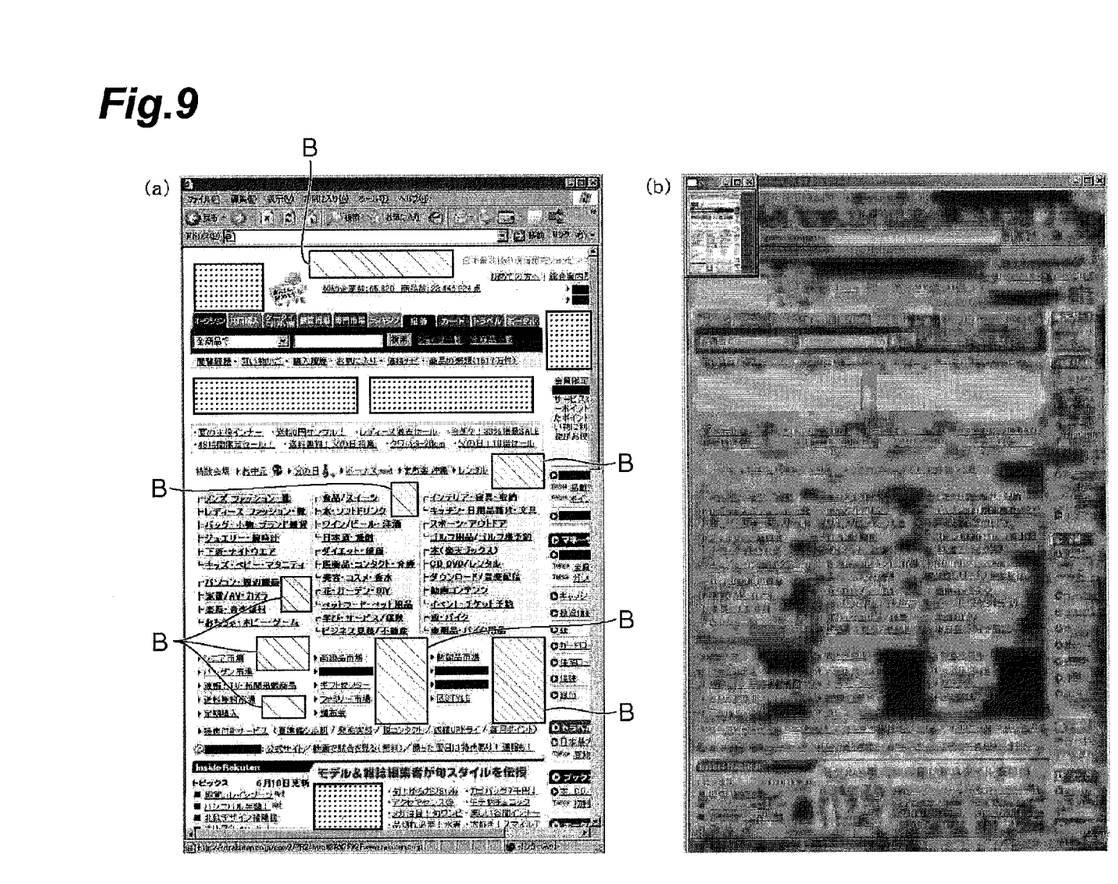
FIG. 9 is an explanation diagram of a Web page and a saliency map.

FIG. 9 illustrates a still image and a saliency map. FIG. 9(a) is a display example of an image captured from a PC screen displaying a Web page. On the other hand, FIG. 9(b) is a display example of a saliency map generated from the image of FIG. 9(a). Note that the still image and the saliency map are both color images.

Symbols B in FIG. 9(a) indicate areas where text, images or the like is not displayed in the Web page, and the areas B are shown by the color corresponding to visible light with a shorter wavelength (generally, purple to green) in the saliency map. On the other hand, areas (areas where text, images or the like is displayed in the Web page) other than the areas B in FIG. 9(a) are shown by the color corresponding to visible light with a longer wavelength (generally, red to yellow) in the saliency map.

An example of a framework for dynamically generating a banner advertisement to be displayed in a Web page is known in, for example, PTL 2. This Literature contains descriptions that (a) material data, templates and display configurations are registered for each of the patterns of banner advertisements as a precondition (FIGS. 4 to 6 etc. of PTL 2), (b) the material data is embedded in the template, and the display configuration is adjusted (S202 and S203 of FIG. 12 of PTL 2), and (c) the size of the whole image banner is adjusted (S204 of FIG. 12 of PTL 2) and the like.

CITATION LIST

Patent Literature

PTL 1: Japanese Unexamined Patent Application Publication No. 2002-183092

PTL 2: Japanese Unexamined Patent Application Publication No. 2002-082874

Non Patent Literature

NPL 1: University of Southern California (USC), "iLab Neuromorphic Vision C++ Toolkit (iNVT)", [online], Internet <URL: http://ilab.usc.edu/toolkit/home.shtml>

NPL 2: University of Southern California (USC), "iLab Neuromorphic Vision C++ Toolkit Screenshots", [online], Internet <URL: http://ilab.usc.edu/toolkit/screenshots.shtml>

SUMMARY OF INVENTION

Technical Problem

Typically, objects displayed in a Web page are mostly fixed in size and shape. Therefore, objects in a Web page are generally statically placed at particular positions with certain sizes and shapes. For example, the banner advertisement in the above PTL 1 is an image files with a fixed size and shape. Thus, the banner advertisement remains still at a particular position in the Web page, with a certain size and shape.

An object of the present invention is to dynamically place an object that fits into a blank area of a Web page.

Solution to Problem

An object display device according to the present invention includes a first receiving means for receiving a request for a Web page from a terminal, a first extracting means for extracting page data corresponding to the request received by the first receiving means from a Web database that stores page data related to the Web page, the page data containing an embedded object display program for placing an object in a blank area in the Web page, a first transmitting means for transmitting the page data extracted by the first extracting means to the terminal, a second receiving means for receiving a request related to the object from the terminal that has specified the blank area by executing the object display program in the page data transmitted by the first transmitting means, a second extracting means for extracting data corresponding to the request received by the second receiving means from an object database that stores data related to the object, and a second transmitting means for transmitting the data extracted by the second extracting means or an object generated based on the data to the terminal, the object based on the data to be placed in the blank area specified in the terminal.

An object display method according to the present invention is an object display method that is executed by a computer connected with a terminal through a communication network, which includes a first receiving step of receiving a request for a Web page from the terminal, a first extracting step of extracting page data corresponding to the request received in the first receiving step from a Web database that stores page data related to the Web page, the page data containing an embedded object display program for placing an object in a blank area in the Web page, a first transmitting step of transmitting the page data extracted in the first extracting step to the terminal, a second receiving step of receiving a request related to the object from the terminal that has specified the blank area by executing the object display program in the page data transmitted in the first transmitting step, a second extracting means for extracting data corresponding to the request received in the second receiving step from an object database that stores data related to the object, and a second transmitting step of transmitting the data extracted in the second extracting step or an object generated based on the data to the terminal, the object based on the data to be placed in the blank area specified in the terminal.

An object display control program according to the present invention causes a computer to function as a first receiving means for receiving a request for a Web page from a terminal, a first extracting means for extracting page data corresponding to the request received by the first receiving means from a Web database that stores page data related to the Web page, the page data containing an embedded object display program for placing an object in a blank area in the Web page, a first transmitting means for transmitting the page data extracted by the first extracting means to the terminal, a second receiving means for receiving a request related to the object from the terminal that has specified the blank area by executing the object display program in the page data transmitted by the first transmitting means, a second extracting means for extracting data corresponding to the request received by the second receiving means from an object database that stores data related to the object, and a second transmitting means for transmitting the data extracted by the second extracting means or an object generated based on the data to the terminal, the object based on the data to be placed in the blank area specified in the terminal.

In a computer-readable recording medium according to the present invention, an object display control program is recorded that causes a computer to function as a first receiving means for receiving a request for a Web page from a terminal, a first extracting means for extracting page data corresponding to the request received by the first receiving means from a Web database that stores page data related to the Web page, the page data containing an embedded object display program for placing an object in a blank area in the Web page, a first transmitting means for transmitting the page data extracted by the first extracting means to the terminal, a second receiving means for receiving a request related to the object from the terminal that has specified the blank area by executing the object display program in the page data transmitted by the first transmitting means, a second extracting means for extracting data corresponding to the request received by the second receiving means from an object database that stores data related to the object, and a second transmitting means for transmitting the data extracted by the second extracting means or an object generated based on the data to the terminal, the object based on the data to be placed in the blank area specified in the terminal.

According to the invention, the object display program for specifying a blank area of a Web page is embedded in page data of the Web page. Thus, the blank area in the Web page indicated by the acquired page data is specified in the terminal. Then, the data related to the object to be placed in the blank area is sent to the terminal, and the object is placed in the blank area. It is thus possible to dynamically place the object in the blank area of the Web page.

In the object display device according to the present invention, the object display program may specify the blank area within a displayed area of a browser on the terminal.

In this case, because the blank area is specified within the displayed area of the browser, the object is placed within the range visible to a user. The object can be thereby surely viewed by the user.

In the object display device according to the present invention, the object display program may specify the blank area each time detecting a given user operation for the browser, and the second receiving means may receive the request related to the object to be placed in the specified blank area each time the user operation is detected and the blank area is specified.

In this case, specification of the blank area and request related to the object to be placed in the blank area are performed each time a user operation for the browser is detected. The object is thereby placed within the displayed area of the browser in response to a user operation, and the object can be thus viewed by the user all the time even when the display configurations of the Web page vary by the user operation.

In the object display device according to the present invention, the Web database may further store candidate data indicating one or a plurality of candidates for the blank area in the Web page, and the object display program may specify the blank area by acquiring the candidate data corresponding to the page data from the Web database and selecting one blank area among the one or plurality of candidates for the blank area indicated by the acquired candidate data.

In this case, because one blank area is selected from the candidates for the blank area, it is possible to flexibly decide the blank area.

In the object display device according to the present invention, the object may be generated in the terminal. It is thereby possible to reduce the processing load in the object display device.

In the object display device according to the present invention, the object database may store the generated object as the data related to the object, the second extracting means may extract the generated object corresponding to the request received by the second receiving means from the object database, the second transmitting means may transmit the generated object extracted by the second extracting means to the terminal, and the generated object transmitted by the second transmitting means may be placed in the blank area specified in the terminal.

In this case, because the process of generating the object is skipped, it is possible to display the object on the terminal more promptly.

Advantageous Effects of Invention

According to the present invention, it is possible to dynamically place the object in the blank area in the Web page.

DESCRIPTION OF EMBODIMENTS

Embodiments

1. System Configuration

Figure 1:
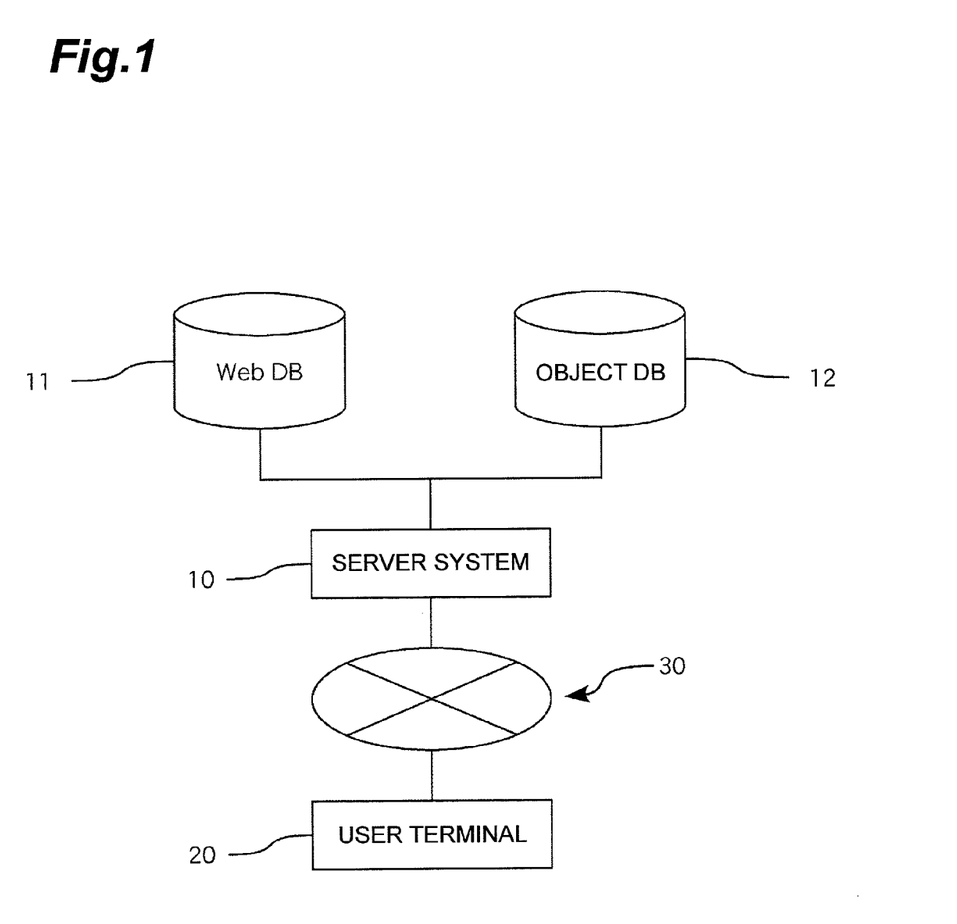
FIG. 1 is a block diagram showing a system configuration (first and second embodiments).

FIG. 1 shows a configuration of a system according to the embodiment. As shown in FIG. 1, the system according to the embodiment is a client/server system in which a server system 10 and a user terminal 20 are connected through a communication network (which is Internet 30 in this embodiment). In this embodiment, an object display device according to the present invention is applied to the server system 10. The server system 10 includes a Web DB (Web database) 11 that stores various page data (HTML and images referred to by the HTML, style sheets, scripts and the like) which constitute a Web page, and an object DB (object database) 12 that stores material data for generating an object (which is a banner in this embodiment). The material data is data related to the object. The material data is banner text and banner URL in a first embodiment, and it is data that further contains a template image in a second embodiment.

[(a) Server System]

In FIG. 1, the server system 10 is a server system in which a Web server, a DB server, an object generation server, and other necessary servers are connected. The server system 10 transmits designated data to the user terminal 20 in response to a request from the user terminal 20. Further, the server system 10 generates an object that satisfies designated conditions and transmits the object to the user terminal 20 in response to a request from the user terminal 20.

[(b) User Terminal]

In FIG. 1, the user terminal 20 is an information processing terminal having communication functions (for example, an electronic computer such as a personal computer). The user terminal 20 has a Web browser, reads data received from the Web server 10 and displays the data on a display. Note that it is assumed that the Web browser is capable of interpretation and execution of a script (for example, a program written in JavaScript (registered trademark)), and settings for interpretation and execution are ON.

2. Object Display Program

[(a) Feature]

In the system according to the embodiment, a script (object display program) is embedded in a Web page that is transmitted from the server system 10, and the user terminal 20 executes the script. It is assumed that a plurality of elements (text, images etc.) are placed in the Web page. The user terminal 20 into which the object display program is read generates an object that fits into a blank area in the Web page or acquires such an object from the server system 10, and places the object in the space in a dynamic manner. After that, the sequential process of generating an object that fits into a blank area in the Web page or acquiring such an object from the server system 10 and dynamically placing the object in the area is repeated each time a given user operation is detected.

[(b) Execution Procedure]

Figure 2:
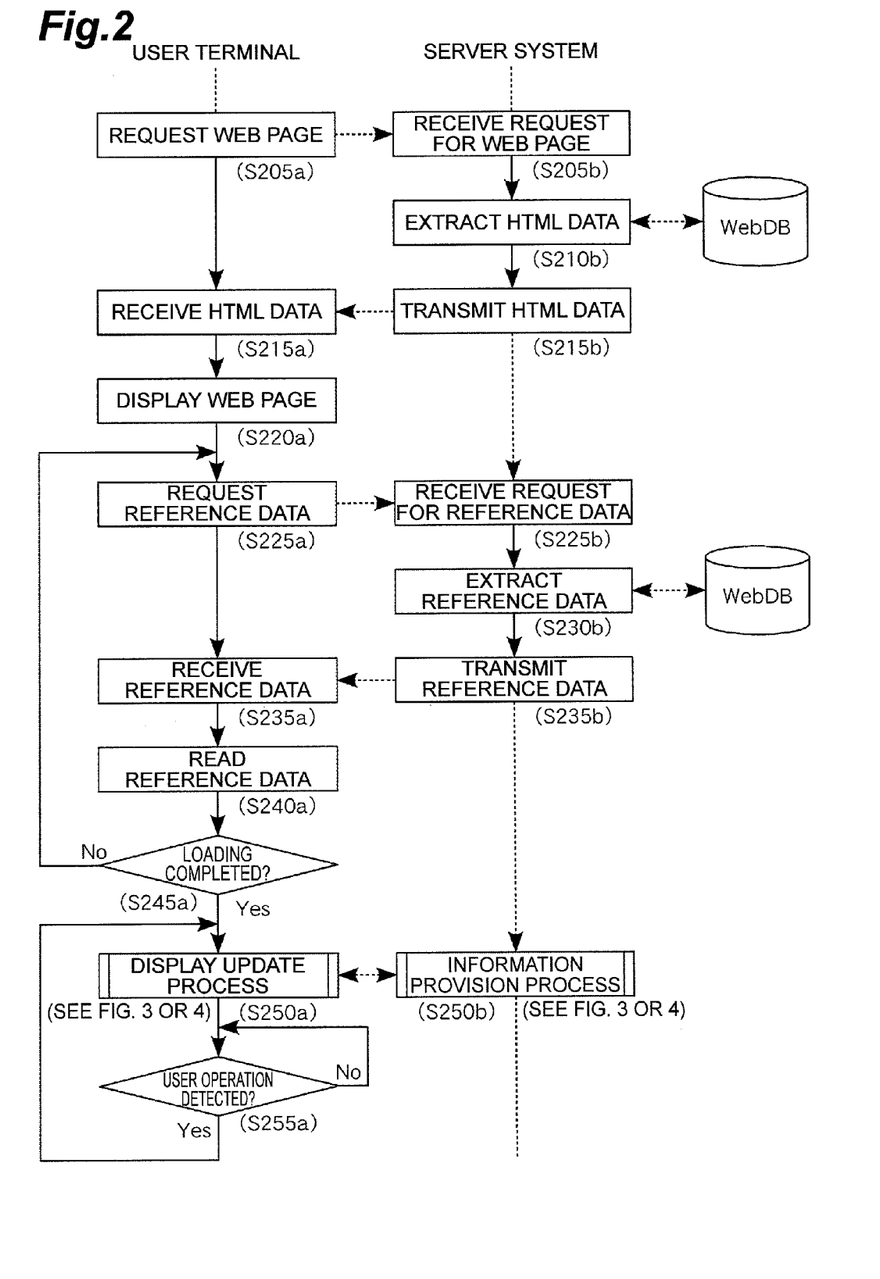
FIG. 2 is a flowchart showing an execution procedure of an object display program (first and second embodiments).

FIG. 2 shows the execution procedure of the object display program in the system according to the embodiment.

<11> The user terminal 20 makes a request for a Web page by designating a URL to the server system 10 (S205a). The server system 10 receives the request for the Web page from the user terminal 20 (S205b, first receiving step) and then extracts HTML data (page data) corresponding to the designated URL from the Web DB 11 (S210b, first extracting step) and transmits the data to the user terminal 20 (S215b, first transmitting step). The user terminal 20 receives the HTML data from the server system 10 (S215a) and displays the Web page on the display (S220a).

<12> The user terminal 20 makes a request for reference data in the HTML data by designating a URL to the server system 10 (S225a). The server system 10 receives the request for the reference data from the user terminal 20 (S225b) and then extracts reference data corresponding to the designated URL from the Web DB 11 (S230b) and transmits the data to the user terminal 20 (S235b). The user terminal 20 receives the reference data from the server system 10 (S235a), reads the reference data (S240a), and reflects the data on the currently displayed Web page according to need.

<13> The user terminal 20 determines whether loading of the Web page (including the reference data) has completed or not (S245a). When the loading has not completed (No in S245a), the process returns to the above <12> and the user terminal 20 further acquires other reference data. On the other hand, when the loading has completed (Yes in S245a), the process proceeds to the following <14>.

Figure 3:
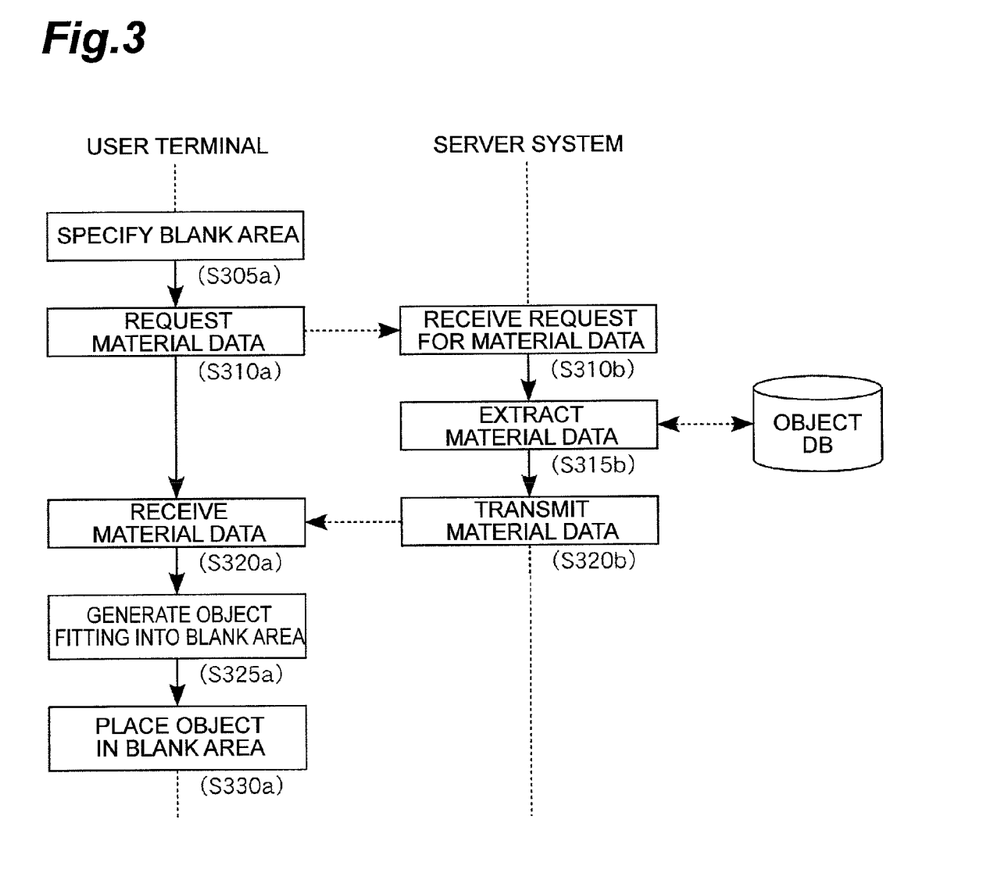
FIG. 3 is a flowchart showing a procedure of a display update process and an information provision process (first embodiment).
Figure 4:
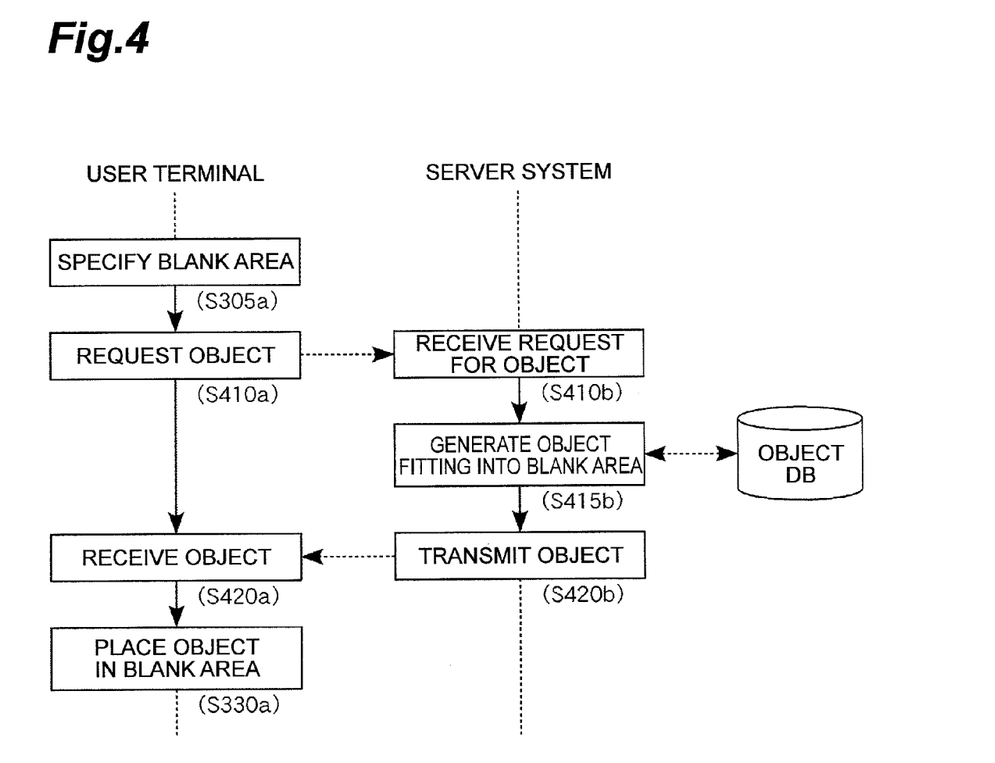
FIG. 4 is a flowchart showing a procedure of a display update process and an information provision process (second embodiment).

<14> The user terminal 20 starts execution of a display update process by the script (object display program) (250a, FIG. 3 or 4). At the same time, the server system 10 executes an information provision process by the program running on the server side (S250b, FIG. 3 or 4). After that, the display update process and the information provision process are repeated each time a given user operation related to a browser (for example, scrolling of the Web page, changing of the window size and the like) is detected (Yes in S255a).

Specifically, the display update process and the information provision process are executed when the user terminal 20 detects that a part of the currently displayed object becomes invisible due to a scrolling operation or an operation to change the window size. Alternatively, the display update process and the information provision process may be executed when the user terminal 20 detects that the whole of the currently displayed object becomes invisible due to a scrolling operation or an operation to change the window size. The user terminal 20 determines whether a part or the whole of the object has gone out of the displayed area of the browser or not by obtaining the display position of the object relative to the displayed area of the browser based on the display position of the object in the Web page, the size of the displayed area of the browser, and the amount of scrolling or the amount of change in the window size.

3. First Embodiment

(3-1) Overview

The user terminal 20 into which the object display program is read specifies a blank area where no element is displayed in a Web page, generates a banner of the size and shape that fit into the specified blank area, and places the generated banner in the specified blank area. Thus, the user terminal 20 into which the object display program is read can generate a banner that fits into the blank area in the Web page and dynamically place the banner in the blank area.

(3-2) Procedure

FIG. 3 shows the procedures of the display update process (S305a to S330a) by the user terminal 20 and the information provision process (S310b to S320b) by the server system 10. As a precondition, it is assumed that a Web page that contains a plurality of static elements (text, images etc.) is displayed in a browser window on the user terminal 20.

<21> The user terminal 20 specifies a blank area where no other element is displayed in the Web page (S305a). For example, the user terminal 20 specifies a blank area in the displayed area of the browser. When a plurality of blank areas can be specified, the user terminal 20 specifies one blank area based on the condition that the range is wider, the horizontal position or/and the vertical position is closer to the center of the displayed area of the browser and the like, for example.

<22> The user terminal 20 makes a request for material data (data related to an object) to the server system 10 (S310a). The server system 10 receives the request for the material data from the user terminal 20 (S310b, second receiving step) and then extracts the material data selected randomly or according to predetermined conditions from the object DB 12 (S315b, second extracting step), and transmits the material data to the user terminal 20 (S320b, second transmitting step). The user terminal 20 receives the material data from the server system 10 (S320a).

<23> The user terminal 20 generates an object (banner) of the size and shape that fit into the blank area specified in the above <21> (S325a). Inside the object (banner), the banner text received in the above <22> is displayed.

<24> The user terminal 20 places the object (banner) generated in the above <23> within the blank area specified in the above <21> (S330a). A hyperlink to the banner URL received in the above <22> is attached to the object (banner). In this case, because the object is generated on the user terminal 20 side, the processing load in the server system 10 can be reduced.

(3-3) Specification of Blank Area

[(a) Technique to Specify Blank Area]

It is preferred to specify the blank area by pixel coordinates (coordinates with the origin (0,0) located at the top left corner of the Web page and with the positive direction of the x-axis and the y-axis along the rightward direction and the downward direction). For example, the size and shape of the blank area are determined by specifying the coordinates at the top left corner, the width and height of a rectangular space in which no other element is contained. Note that the shape of the blank area may be specified by other shapes (for example, a circle specified by the center coordinates and the radius or the like).

[(b) Candidate for Blank Area]

It is known that areas where an image or the like is not displayed are shown by the color corresponding to visible light with a shorter wavelength (generally, purple to green) in the saliency map. Utilizing this fact, it is possible to set candidates for the blank area in advance. By referring to "candidate data" related to the candidates for the blank area, the user terminal 20 can specify the blank area by simply selecting any one of the candidates (for example, a candidate located within the displayed area of the browser) and correcting the range according to need. It is thereby possible to flexibly decide the blank area.

Generation and embedding of "candidate data" are as follows.

<31> Generate a saliency map from a capture image of a Web page and specify a rectangle which fits into an area where the color corresponding to visible light with a shorter wavelength than a predetermined criterion appears continuously.

<32> Store values (for example, the coordinates at the top left corner, the width and height and the like) related to one or a plurality of rectangles specified in the above <31> as "candidate data" in a given format (for example, JSON format) into the Web DB 11.

<33> Add the URL of the "candidate data" generated in the above <32> to the value of the src attribute of <script> element. The user terminal 20 into which the Web page is read thereby statically reads the "candidate data" (see S225a to S240a of FIG. 2).

Besides, it is feasible to assign priorities that reflect color data of corresponding pixels in the saliency map to each of the pixel coordinates in the Web page and store the priorities as "candidate data" in a given format (for example, JSON format) as a data file. In this case, the most of the process of specifying the blank area (for example, a rectangular space that does not contain a pixel with a lower priority than a predetermined criterion) in the Web page is executed by the user terminal 20.

[(c) Displayed Area of Browser]

The displayed area of the browser is a rectangle that is defined by the following range in pixel coordinates. By specifying the blank area within this range, an object (banner) is displayed on the screen all the time.

X coordinate at the top left corner (the cumulative value of the amount of rightward scrolling)

Y coordinate at the top left corner (the cumulative value of the amount of downward scrolling)

Width (the value of the width of displayed area of the browser+the cumulative value of the amount of rightward scrolling)

Height (the value of the height of displayed area of the browser the cumulative value of the amount of downward scrolling)

Note that the values of the width and height of the displayed area of the browser can be acquired as the values of the following properties, for example, in an object displacement program.

Width of displayed area of browser: document.documentElement.clientWidth,document.body.clientWidth Height of displayed area of browser: document.documentElement.clientHeight,document.body.clientHeight

(3-4) Generation and Placement of Object

It is preferred to draw a figure (for example, a rectangle that overlaps a rectangular space) that fits into a specified blank area (for example, a rectangular space) and further draw banner text related to the received material data so as to fit to the inside of the rectangle. Note that it is preferred to employ the following technique, for example, to draw a figure of a specific size and shape inside the web page. Further, it is preferred to use TextAPI to draw text within the <canvas> element.

(a) Generate the <canvas> element of the size and range that overlap the whole area of the Web page, and draw a rectangle of the position, size and range that overlap the blank area (rectangular space).

(b) Generate the <canvas> element of the position, size and range that overlap the blank area (rectangular space), and draw a rectangle over the whole area of the <canvas> element.

Besides, the following process may be executed in the user terminal 20, for example.

Generate an image banner in a given format (for example, SVG (Scalable Vector Graphics) format) that fits into the blank area.

Add text (for example, text in SVG format) of the image banner to the value of the src attribute of an appropriate tag (for example, <img> tag, <object> tag or the like) in a given format (for example, "data URL scheme" (RFC2397) format).

In this case, it is preferred to embed the received banner text into the image banner.

(3-5) Effects of First Embodiment

In the first embodiment, material data (banner text, banner URL) is acquired from the server system 10 in every process of generating an object (banner) (S310a to S325a). The following effects are thereby obtained, for example.

When the material data is the same, it appears as if the banner of the same content is shifting over the blank areas (gaps) in the Web page with its shape changing in conjunction with a given user operation.

When the material data is not the same, it appears as if the banner of different contents is shifting over the blank areas (gaps) in the Web page with its shape changing in conjunction with a given user operation.

(3-6) Alternative Example Related to Placement of Object

Other techniques to change the display position and the shape of an object in the Web page in response to a user operation include a technique using pattern matching and a technique using labeling, for example.

In the case of using the pattern matching, the user terminal 20 acquires a plurality of patterns indicating the outline of the object (outline pattern) in advance. Data indicating a plurality of outline patterns may be written in the script in the Web page or may be acquired from the server system 10 separately from the Web page. In any case, the user terminal 20 checks each of the acquired plurality of outline patterns against the saliency map of the Web page and thereby specifies the outline pattern as it is or specifies the blank area in which, the outline pattern, when scaled down or up, is included and a difference from the outline pattern is the smallest in the above-described Step S305a. As the blank area, the user terminal 20 may specify the space that matches the outline pattern (the blank area of which difference from the outline pattern is zero) or the space that matches the scaled-down or scaled-up outline pattern (the blank area of which difference from the scaled-down or scaled-up outline pattern is zero), for example. In any case, the user terminal 20 may specify the outline pattern of which size is the closest to the area of the blank area. When the outline pattern to be included in the blank area of the Web page can be specified together with the scale rate, the user terminal 20 generates the object of the same shape or size as the specified outline pattern or generates the object by scaling down or scaling up the same shape as the specified outline pattern with the specified scale rate by using the material data in the above-described Step S325a. The term inclusion involves the case where the shape and size match.

In the case of using the labeling, the user terminal 20 binarizes the saliency map of the Web page in the above-described Step S305a. Next, the user terminal 20 performs scanning (for example, Raster scanning) of all pixels included in the binarized saliency map in sequence and thereby specifies the area in which different characteristics (i.e. saliency) from adjacent spaces appear and in which the entropy is low or the degree of saliency is low as the blank area. After that, the user terminal 20 generates the object that fits with the shape and size of the specified blank area by using the material data in the above-described Step S325a.

The above labeling allows more flexible specification of the blank area compared to the case of using the pattern matching. On the other hand, the pattern matching allows greater reduction of processing load compared to the case of using the labeling.

Note that, in the case where a plurality of blank areas are specified, regardless of the pattern matching or the labeling, the user terminal 20 selects one blank area among them as the object display area. For example, the user terminal 20 selects the largest blank area.

4. Second Embodiment (4-1) Overview

The user terminal 20 into which the object display program is read specifies a blank area where no element is displayed in a Web page, acquires an image banner that fits into the specified blank area, and places the acquired image banner in the specified blank area. Thus, the user terminal 20 into which the object display program is read can acquire the image banner that fits into the blank area in the Web page and dynamically place the image banner in the space.

(4-2) Procedure

FIG. 4 shows the procedures of the display update process (S305a to S330a) by the user terminal 20 and the information provision process (S410b to S420b) by the server system 10. As a precondition, it is assumed that a Web page that contains a plurality of static elements (text, images etc.) is displayed in a browser window on the user terminal 20. Note that, in FIG. 4, the processing steps denoted by the same reference symbols as those in FIG. 3 are the same processing.

<41> The user terminal 20 specifies a blank area where no other element is displayed in the Web page (S305a). For example, the user terminal 20 specifies a blank area in the displayed area of the browser. When a plurality of blank areas can be specified, the user terminal 20 specifies one blank area based on the condition that the range is wider, the horizontal position or/and the vertical position is closer to the center of the displayed area of the browser and the like, for example.

<42> The user terminal 20 makes a request for an object (image banner) to the server system 10 (S410a). The request for the object contains data designating the size and shape of the blank area (for example, the width and height of a rectangular space). The server system 10 receives the request for the object (image banner) from the user terminal 20 (S410b, second receiving step) and then generates the object (image banner) that fits into the space of the designated size and shape based on material data (data related to the object) extracted from the object DB 12 (S415b), and transmits the object (image banner) to the user terminal 20

(S420b, second transmitting step). The user terminal 20 receives the object (image banner) from the server system 10 (S420a).

<43> The user terminal 20 places the object (image banner) acquired in the above <42> within the blank area specified in the above <41> (S330a). A hyperlink to the banner URL received in the above <42> is attached to the object (image banner). In this case, because the generated object is transmitted from the server system 10 to the user terminal 20 and placed in the blank area, the processing of generating the object can be skipped in the user terminal 20. As a result, the processing load in the user terminal 20 can be reduced.

(4-3) Generation of Object

It is preferred to extract the material data selected randomly or according to predetermined conditions from the object DB 12 and generate the object (image banner) using the material data. For example, the image banner is generated by randomly selecting a template that fits into the space of the designated size and shape and embedding banner text in the template.

(4-4) Effects of Second Embodiment

In the second embodiment, an object (image banner) is acquired from the server system 10 each time the object (image banner) is required (S410a to S420a). The following effects are thereby obtained, for example.
- When the content is the same, it appears as if the banner of the same content is shifting over the blank areas (gaps) in the Web page with its shape changing in conjunction with a given user operation.
- When the content is not the same, it appears as if the banner of different contents is shifting over the blank area (gaps) in the Web page with its shape changing in conjunction with a given user operation.

(4-5) Alternative Example Related to Placement of Object

In the second embodiment also, pattern matching and labeling can be used as other techniques to change the display position and the shape of the object in the Web page in response to a user operation.

In the case of using the pattern matching, the user terminal 20 acquires a plurality of outline patterns in advance just like the first embodiment. The user terminal 20 checks each of the acquired plurality of outline patterns against the saliency map of the Web page and thereby specifies the outline pattern as it is or specifies the blank area in which, the outline pattern, when scaled down or up, is included and a difference from the outline pattern is the smallest in the above-described Step S305a. When the outline pattern to be included in the blank area of the Web page can be specified, the user terminal 20 transmits a request containing data indicating the specified outline pattern to the server system 10 in the above-described Step S410a.

In this case, the object DB 12 previously stores, for each banner, a plurality of patterns of objects of which the shapes match (or similar to) the respective shapes of a plurality of outline patterns or a plurality of patterns of objects of which both the shapes and sizes match the respective outline patterns. The server system 10 extracts the object corresponding to the outline pattern indicated by the received request, which is, the object having the same shape as the outline pattern or the object having the same shape and size as the outline pattern, from the object DB 12 in the above-described Step S415b. Then, the server system 10 transmits the extracted object or the scaled-down or scaled-up extracted object to the user terminal 20 in the above-described Step S420b. The object that fits with the specified blank area is thereby placed in the user terminal 20 in the above-described Step S330a.

In the case of using the labeling, the user terminal 20 performs scanning (for example, Raster scanning) of all pixels in the binarized saliency map in sequence and thereby specifies the space in which different characteristics (i.e. saliency) from adjacent spaces appear and in which the entropy is low or the degree of saliency is low as the blank area in the above-described Step S305a, just like the first embodiment. Then, the user terminal 20 transmits a request containing the shape and size of the specified blank area to the server system 10 in the above-described Step S410a.

In this case, the object DB 12 stores material data. The server system 10 extracts the material data required for generation of the object and generates the object that matches the shape and size of the blank area indicated by the received request or the object which, when scaled down or up, is included and has the smallest difference from the black space by using the material data in the above-described Step S415b. Then, the server system 10 transmits the generated object to the user terminal 20 in the above-described Step S420b. The object that fits with the specified blank area is thereby placed in the user terminal 20 in the above-described Step S330a.

Note that, in the case where a plurality of blank areas are specified, one space is selected among the plurality of blank areas just like the first embodiment.

5. Example of Screen Display

FIGS. 5 to 8 show display examples of a Web page (common to the first and second embodiments). In this example, for the sake of explanation of the features of the first and second embodiments (the point that dynamically places an object that fits into a blank area of a Web page in the blank area), the case where the content of the banner is the same is illustrated. The shaded part in FIGS. 5 to 8 indicates the area where text, images or the like is displayed, which is, the area other than the blank area.

Figure 5:
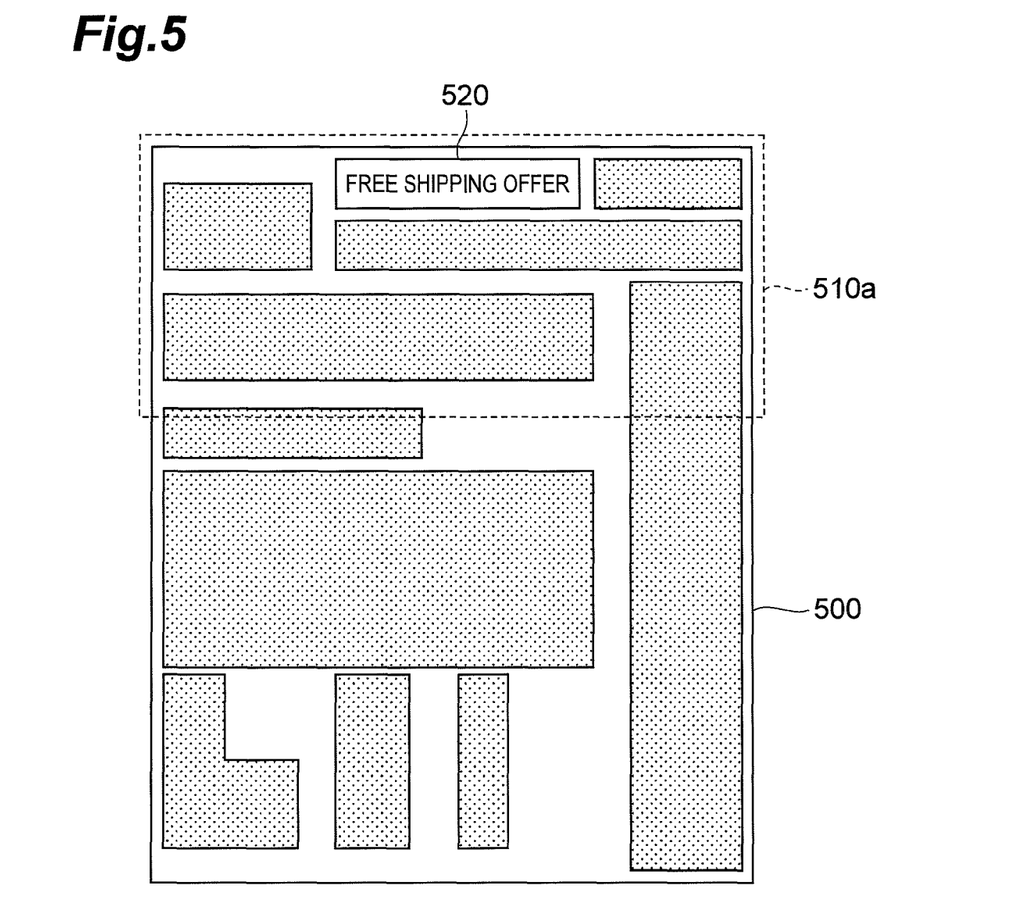
FIG. 5 is a display example of a Web page (before scrolling) (first and second embodiments).
Figure 6:
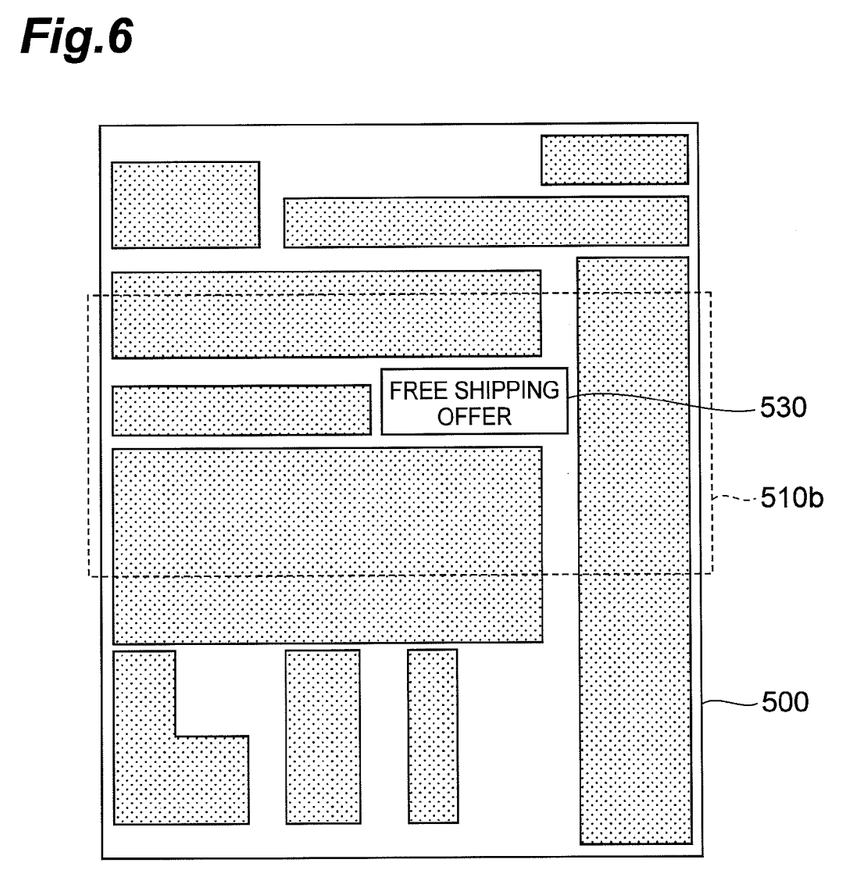
FIG. 6 is a display example of a Web page (after scrolling) (first and second embodiments).
Figure 7:
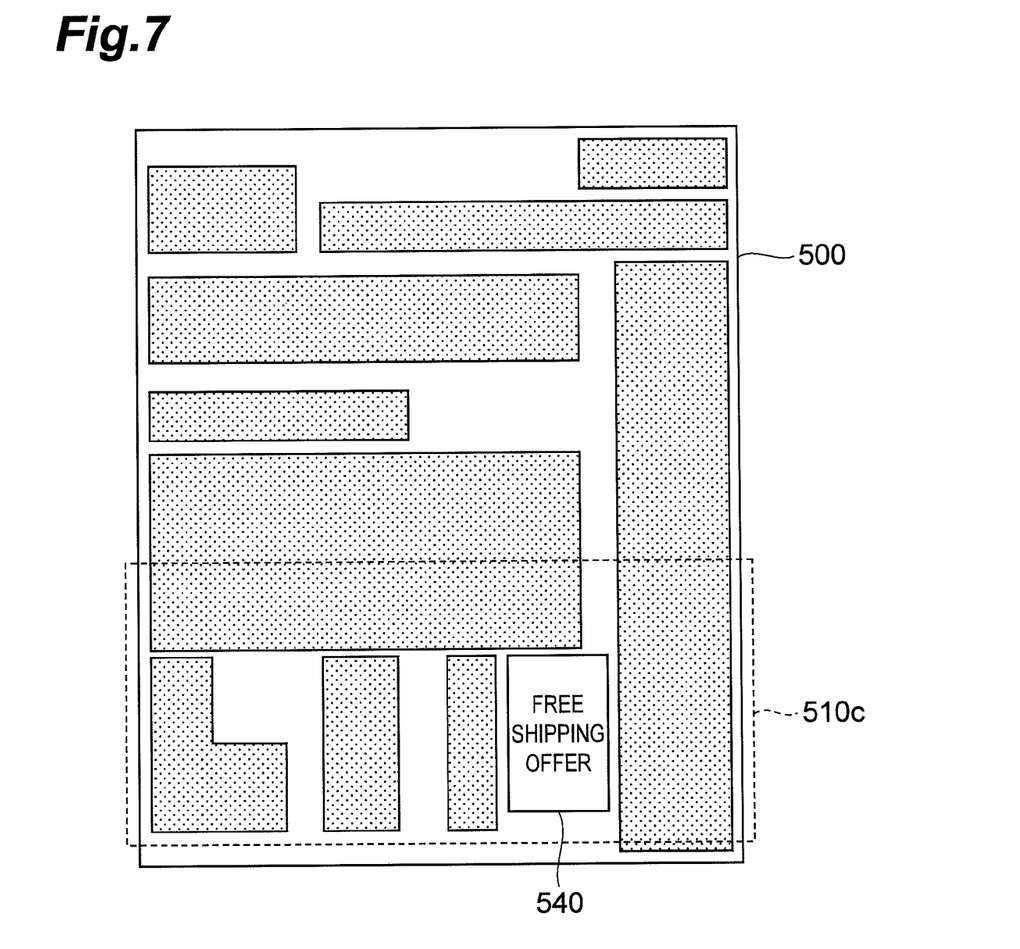
FIG. 7 is a display example of a Web page (after scrolling) (first and second embodiments).

In FIG. 5, the range of a space 510a in a Web page 500 is displayed within the displayed area of the browser. Further, a banner 520 is displayed in the blank area specified in the space 510a. Assume that the range of a space 510b in the Web page 500 is displayed within the displayed area of the browser after that due to scrolling on the browser as shown in FIG. 6. Then, a banner 530 is displayed in the blank area specified in the space 510b. The banner 520 that has moved outside of the displayed area is removed. After that, when the range of a space 510c in the Web page 500 is displayed within the displayed area of the browser as shown in FIG. 7, the banner 530 is removed, and a banner 540 is displayed. To be more specific, the banner 540 is material data which is prepared separately from the banner 530. In other words, two types of banners, a vertical banner and a horizontal banner, are prepared in this case. Then, when the range of the space 510c in the Web page 500 is displayed within the displayed area of the browser, the material data corresponding to the vertical banner that fits with the space 510c is extracted by the server system 10, and the banner 540 is thereby displayed.

Figure 8:
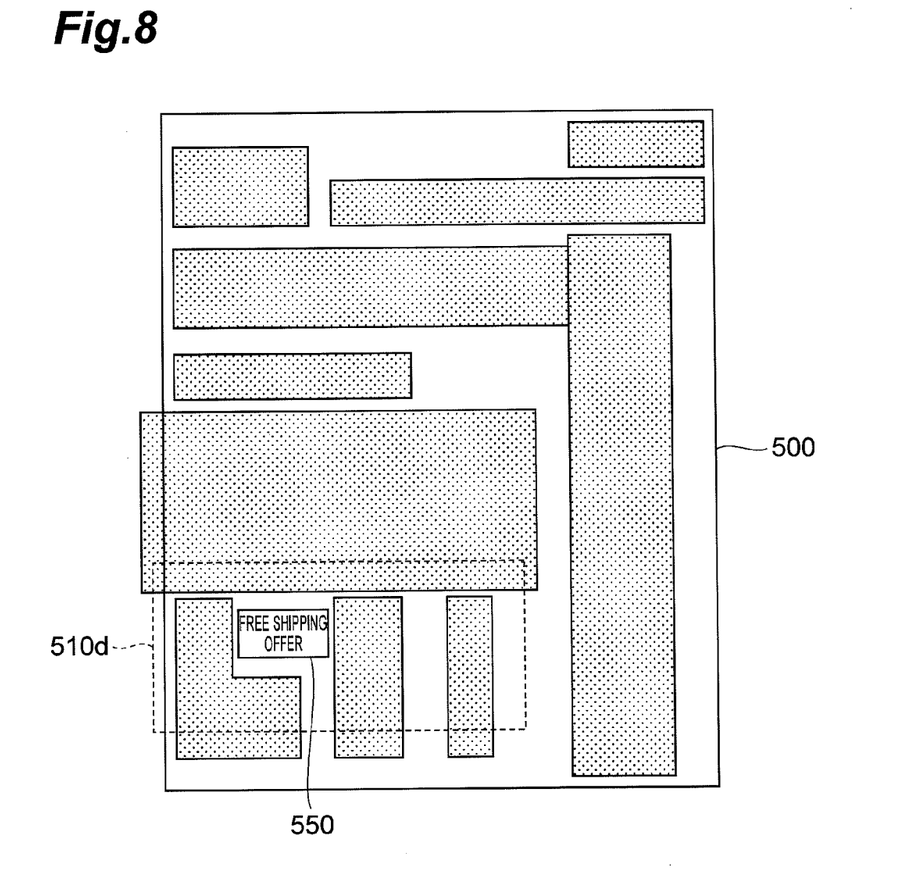
FIG. 8 is a display example of a Web page (after size change) (first and second embodiments).

Assume that the range of a space 510*d* in the Web page 500 is displayed within the displayed area of the browser after that in conjunction with a change of the size of the browser window as shown in FIG. 8. Then, a banner 550 is displayed in the blank area specified in the space 510*b*. At this time, the banner 540 that has partly moved outside of the displayed area is removed.

During execution of a series of banner displays shown in FIGS. 5 to 8, it appears to the user's eyes as if the banner moves from one place to another within the browser with its position, size and shape changing.

As is obvious from the display examples of FIGS. 5 to 8, the user terminal 20 into which the object display program according to the first or second embodiment is read can dynamically place an object that fits into a blank area of a Web page in the blank area. Particularly, when the content of the banner is the same, it appears as if the banner of the same content is shifting over the blank areas (gaps) in the Web page with its shape changing in conjunction with a given user operation.

6. Alternative Example

(6-1) Alternative Example of First Embodiment (Alternative Example 1) Generate Object Containing Originally Downloaded Material Data An object (banner) may be generated by repeatedly using material data (banner text, banner URL) that has been downloaded before the start of the execution of the object display program. The following effect is thereby obtained, for example.

It appears as if the banner of the same content is shifting over the blank areas (gaps) in the Web page with its shape changing in conjunction with a given user operation.

(Alternative Example 2) Generate Object Containing Material Data Selected from Batch-Downloaded Material Data An object (banner) may be generated by using one or a plurality of material data selected from a plurality of material data (banner text, banner URL) that have been batch-downloaded before the start of the execution of the object display program. The following effects are thereby obtained, for example.

When the same material data is selected, it appears as if the banner of the same content is shifting over the blank areas (gaps) in the Web page with its shape changing in conjunction with a given user operation.

When different material data are selected, it appears as if the banner of different contents is shifting over the blank areas (gaps) in the Web page with its shape changing in conjunction with a given user operation.

(Alternative Example 3) Place Object Selected from Batch-Downloaded Objects in Blank Area One or a plurality of objects selected from a plurality of objects (for example, banners in image format) that have been batch-downloaded before the start of the execution of the object display program may be placed in the blank area. For example, the object of the size and shape that fit into the blank area is randomly selected. In this case, the object generation process is skipped. The following effects are thereby obtained, for example.

When the same object is selected, it appears as if the same banner is shifting over the blank areas (gaps) in the Web page with its shape remaining unchanged in conjunction with a given user operation.

When different objects are selected, it appears as if different banners are shifting over the blank areas (gaps) in the Web page with their shapes changing in conjunction with a given user operation.

Note that, even when the objects (banners in image format) are different, the following effect is obtained, for example, as long as the text in the objects is the same.

It appears as if the banner of the same content is shifting over the blank areas (gaps) in the Web page with its shape changing in conjunction with a given user operation.

(6-2) Alternative Example of Second Embodiment (Alternative Example 1) Select Object Fitting into Space of Designated Size and Shape When a plurality of patterns of objects (image banners containing character data) are stored in the object DB 12, the server system 10 may extract the object that fits into the space of the designated size and shape from the object DB 12 each time receiving a request for the object and transmit the extracted object to the user terminal 20. Because this allows skipping of the process of generating an object, it is possible to display the object (image banner) on the user terminal 20 more promptly, though the total data storage size increases.

(Alternative Example 2) Generate Object without Using Template

An object (image banner) may be generated without using a template. For example, an object (image banner) may be generated by embedding banner text related to material data within a frame of the same size and shape as the space of the designated size and shape.

(6-3) Other Alternative Examples

The transparency of an object may be heightened. In this case, even when some element is contained in the range specified as the blank area and the object overlaps the element, the element at the back can be viewed.

The object is not necessarily a banner advertisement, and it may be a simple figure that does not contain text, an image that contains text of the non-advertising content, or a pop-up screen, for example. Further, the object may be a button (shopping cart button) to add to a shopping cart in a Web site of electronic commerce. If the present invention is applied to display of a shopping cart button, the button continues to be displayed within the displayed area of the browser all the time even when the Web page is scrolled to view product information, for example. It is thereby possible to prevent the shopping cart button from disappearing from the displayed area due to scrolling, thus eliminating the need for a user to perform further scrolling in order to display the shopping cart button on the screen. This improves user-friendliness of an electronic commerce site.

(6-4) Supplementary Explanation

Preferably, the object currently displayed in the blank area that has gone out of the displayed area of the browser by a given user operation is removed by explicit processing. For example, the currently displayed object is removed just before a new object is displayed (see FIGS. 5 to 8). Note that, when the currently displayed object is removed automatically by display processing of a new object, explicit removal processing is not necessary.

In some cases, substantially the same space is specified as the blank area after a given user operation is detected. For example, when the space which is substantially the same before and after a user operation (for example, a change of the window size) is specified as the blank area, the position of the object does not substantially change, and only the shape of the object or only the shape and the content of the object change.

A program (object display control program) for causing a computer to execute the sequential process of the server system 10 described above is provided by being recorded on a tangible recording medium such as CD-ROM, DVD, ROM, or semiconductor memory, for example. Further, the program may be provided as a data signal superimposed on a carrier wave through a communication network.

The object display control program has modules corresponding to the functions of the server system 10 described above, and the modules are read into a computer and executed, so that the above-described functions are implemented. Note that the modules of the object display control program may be installed in any of a plurality of computers, not a single computer. In this case, the above-described sequential process is performed by a computer system composed of the plurality of computers.

Note that, at the time of dynamically placing an object in the blank area of a given Web page by applying the present invention, it may be necessary to obtain approval in advance from the author of the Web page regarding the dynamic placement of the object. For example, in the case of dynamically placing a banner advertisement in a certain blog page, approval for the dynamic placement of the object can be obtained from the author of the blog in return for some payment for an affiliate earning to the author.

As described above, according to the embodiment, the object display program for specifying a blank area of a Web page is embedded in page data for displaying the Web page. Thus, in the user terminal 20 that has acquired the page data, the blank area in the Web page that is displayed based on the page data is specified. Then, data related to an object to be placed within the blank area is sent to the user terminal 20, and the object is placed in the blank area. It is thus possible to dynamically place the object in the blank area of the Web page.

Further, according to the embodiment, because the blank area is specified within the displayed area of the browser, the object is placed within the range visible to a user. The object can be thereby surely viewed by the user.

Furthermore, according to the embodiment, specification of the blank area and request for data related to the object to be placed in the blank area are performed each time a user operation for the browser (for example, a scrolling operation or an operation to change the size of a browser window) is detected. Because the object is placed within the displayed area of the browser in response to a user operation, the object can be viewed by the user all the time even when the display configurations of the Web page vary by the user operation.

REFERENCE SIGNS LIST

10 . . . Server system, 11 . . . Web DB, 12 . . . Object DB, 20 . . . User terminal, 30 . . . Internet

The invention claimed is:

1. An object display device configured with a processor, comprising:
at least one memory operable to store computer program instructions;
at least one processor operable to read said computer program and operate according to said program, said program including:
a first receiver module configured to cause at least one of said at least one processors to receive a request for a Web page from a terminal;
a first extractor module configured to cause at least one of said at least one processors to extract page data corresponding to the request received by the first receiver module from a Web database that stores page data related to the Web page, the page data contain an embedded object display program in which execution of the object display program dynamically specifies a blank area among a plurality of candidate blank areas in the Web page for placing an object in the specified blank area;
a first transmitter module configured to cause at least one of said at least one processors to transmit the page data extracted by the first extractor module to the terminal;
a second receiver module configured to cause at least one of said at least one processors to receive a request related to the object from the terminal that has specified the blank area by executing the object display program in the page data transmitted by the first transmitter module;
a second extractor module configured to cause at least one of said at least one processors to extract data corresponding to the request received by the second receiver module from an object database that stores data related to the object; and
a second transmitter module configured to cause at least one of said at least one processors to transmit the data extracted by the second extractor module or an object generated based on the data to the terminal, the object based on the data to be placed in the blank area specified in the terminal, wherein:
the object display program specifies the blank area within a displayed area of a browser on the terminal in response to a given user operation for the browser,
the second receiver module causes at least one of said at least one processors to receive the request related to the object to be placed in the specified blank area each time the blank area is specified in response to the user operation,
the object display device is configured to cause at least one of said at least one processors to generate an object that fits into the specified blank area by designating the size and shape of the blank area, and
when the plurality of blank areas are specified, the object display program specifies one of the blank area whose range is the widest and the blank area whose horizontal position and vertical position are the closest to the center of the displayed area of the browser.

2. The object display device according to claim 1, wherein the Web database further stores candidate data indicating one or a plurality of candidates for the blank area in the Web page, and
the object display program specifies the blank area by acquiring the candidate data corresponding to the page data from the Web database and selecting one blank area among the one or plurality of candidates for the blank area indicated by the acquired candidate data.

3. The object display device according to claim 1, wherein the object is generated in the terminal.

4. The object display device according to claim 1, wherein the object database stores the generated object as the data related to the object, the second extractor module is further configured to cause at least one of said at least one processors to extract the generated object corresponding to the request received by the second receiver module from the object database, the second transmitter module is further configured to cause at least one of said at least one processors to transmit the generated object extracted by the second extractor module to the terminal, and the generated object transmitted by the second transmitter module is placed in the blank area specified in the terminal.

5. An object display method executed by a computer connected with a terminal through a communication network, comprising:

a first receiving step of receiving a request for a Web page from the terminal;

a first extracting step of extracting page data corresponding to the request received in the first receiving step from a Web database that stores page data related to the Web page, the page data contain an embedded object display program in which execution of the object display program dynamically specifies a blank area among a plurality of candidate blank areas in the Web page for placing an object in the specified blank area;

a first transmitting step of transmitting the page data extracted in the first extracting step to the terminal;

a second receiving step of receiving a request related to the object from the terminal that has specified the blank area by executing the object display program in the page data transmitted in the first transmitting step;

a second extracting step for extracting data corresponding to the request received in the second receiving step from an object database that stores data related to the object; and a second transmitting step of transmitting the data extracted in the second extracting step or an object generated based on the data to the terminal, the object based on the data to be placed in the blank area specified in the terminal, wherein:

the object display program specifies the blank area within a displayed area of a browser on the terminal in response to a given user operation for the browser, in the second receiving step, the request related to the object to be placed in the specified blank area is received each time the blank area is specified in response to the user operation, the object display program causes the computer to generate an object that fits into the specified blank area by designating the size and shape of the blank area, and when the plurality of blank areas are specified, the object display program specifies one of the blank area whose range is the widest and the blank area whose horizontal position and vertical position are the closest to the center of the displayed area of the browser.

6. A non-transitory computer-readable recording medium in which an object display control program is recorded, the object display control program causing a computer to:

receive a first request for a Web page from a terminal;

extract page data corresponding to the received first request from a Web database that stores page data related to the Web page, the page data contain an embedded object display program in which execution of the object display program dynamically specifies a blank area among a plurality of candidate blank areas in the Web page for placing an object in the specified blank area;

transmit the extracted page data to the terminal;

receive a second request related to the object from the terminal that has specified the blank area by executing the object display program embedded in the transmitted page data;

extract data corresponding to the received second request from an object database that stores data related to the object; and transmit the extracted data corresponding to the received second request or an object generated based on the data to the terminal, the object based on the data to be placed in the blank area specified in the terminal, wherein:

the object display program specifies the blank area within a displayed area of a browser on the terminal in response to a given user operation for the browser, the request related to the object to be placed in the specified blank area is received each time the blank area is specified in response to the user operation, the object display control program causes the computer to generate an object that fits into the specified blank area by designating the size and shape of the blank area, and when the plurality of blank areas are specified, the object display program specifies one of the blank area whose range is the widest and the blank area whose horizontal position and vertical position are the closest to the center of the displayed area of the browser.

7. The object display device according to claim 1, wherein the plurality of candidate blank areas exist after static elements are displayed in the Web page.

8. The object display device according to claim 1, wherein the page data is data of a Web page of electronic commerce and the object is a shopping cart button to add to a shopping cart.

* * * * *